United States Patent
Abramoff et al.

(10) Patent No.: US 7,712,898 B2
(45) Date of Patent: May 11, 2010

(54) METHODS AND SYSTEMS FOR OPTIC NERVE HEAD SEGMENTATION

(75) Inventors: Michael D. Abramoff, Iowa City, IA (US); Young Kwon, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 64 days.

(21) Appl. No.: 11/695,779

(22) Filed: Apr. 3, 2007

(65) Prior Publication Data

US 2007/0230795 A1 Oct. 4, 2007

Related U.S. Application Data

(60) Provisional application No. 60/788,767, filed on Apr. 3, 2006, provisional application No. 60/789,045, filed on Apr. 4, 2006.

(51) Int. Cl.
*A61B 3/14* (2006.01)
*A61B 3/10* (2006.01)

(52) U.S. Cl. .................. 351/206; 351/210; 351/221

(58) Field of Classification Search ......... 351/205–206, 351/210, 221
See application file for complete search history.

(56) References Cited

U.S. PATENT DOCUMENTS

| | | | |
|---|---|---|---|
| 5,270,924 A | 12/1993 | Hideshima | |
| 5,857,030 A | 1/1999 | Gaborski et al. | |
| 5,868,134 A | 2/1999 | Sugiyama et al. | |
| 6,053,865 A | 4/2000 | Sugiyama et al. | |
| 6,104,828 A | 8/2000 | Shioiri | |
| 6,276,798 B1 | 8/2001 | Gil et al. | |
| 6,567,682 B1 | 5/2003 | Osterweil et al. | |
| 6,714,672 B1 | 3/2004 | Berestov et al. | |
| 6,728,561 B2 | 4/2004 | Smith et al. | |
| 6,731,782 B2 | 5/2004 | Ashton | |
| 6,830,336 B2 | 12/2004 | Fransen | |
| 7,343,032 B2 * | 3/2008 | Oakley et al. | 382/128 |
| 2003/0071970 A1 | 4/2003 | Donnerhacke et al. | |
| 2004/0085542 A1 | 5/2004 | Soliz et al. | |
| 2004/0105074 A1 | 6/2004 | Soliz et al. | |

OTHER PUBLICATIONS

International Search Report and Written Opinion for International Application No. PCT/US07/065862, issued by the International Searching Authority, dated Sep. 17, 2008.

"Segmentation"; Image Processing Fundamentals—Segmentation; Website: www.ph.tn.tudelft.nl/Courses/FIP/frames/fip-Segmenta. html; pp. 1-9, Jul. 2, 2007.

(Continued)

*Primary Examiner*—Scott J Sugarman
*Assistant Examiner*—Dawayne A Pinkney
(74) *Attorney, Agent, or Firm*—Ballard Spahr LLP

(57) ABSTRACT

A method of classifying an optic nerve cup and rim of an eye from a retinal image comprising receiving a retinal image, determining a feature vector for a candidate pixel in the retinal image, and classifying the candidate pixel as a cup pixel or a rim pixel based on the feature vector using a trained classifier. The retinal image can be a stereo pair, the retinal image can be color or monochrome. The method disclosed can further comprise identifying an optic nerve, identifying an optic nerve cup and optic nerve rim, and determining a cup-to-disc ratio.

21 Claims, 9 Drawing Sheets

OTHER PUBLICATIONS

Eye Conditions Encyclopedia; "Optic Nerve Imaging"; EyeMDLink.com; Dec. 3, 2005; pp. 1-2.

Swindale, et al.; "Automated Analysis of Normal and Glaucomatous Optic Nerve Head Topography Images"; Investigate Ophthalmology & Visual Science; vol. 41; No. 7; Jun. 2000; pp. 1730-1742.

Keith Goatman; "Automated Detection of Microaneurysms"; Website: www.biomed.abdn.ac.uk/Abstracts/A07890/; Abstracts Reports; Bio-Medical Physics & Bio-Engineering, University of Aberdeen; 2002; pp. 1-6.

Ginneken, et al.; "IOP Image Processing Project Proposal: Computer-aided Diagnosis for Diabetic Retinopathy Detection in Fundus Images"; Apr. 5, 2002; pp. 1-23.

Chrástek, et al.; "Automated Segmentation of the Optic Nerve Head for Diagnosis of Glaucoma"; Medical Image Analysis 9; 2005; pp. 297-314.

Yale Medicine Winter/Spring 1998; "Imaging the Eye"; Medicine's New Eyes; pp. 1-3.

Huang, et al.; "Development and Comparison of Automated Classifiers for Glaucoma Diagnosis Using Stratus Optical Coherence Tomography"; Investigative Ophthalmology & Visual Science; vol. 46; No. 11; Nov. 2005; pp. 4121-4129.

Lliev, et al.; "Morphometric Assessment of Normal, Suspect and Glaucomatous Optic Discs with Stratus OCT and HRT II"; Eye 2005; pp. 1-12.

Martus, et al.; "Multivariate Approach for Quantification of Morphologic and Functional Damage in Glaucoma"; Investigative Ophthalmology & Visual Science; vol. 41, No. 5; Apr. 2000; pp. 1099-1110.

Johnson, et al.; "Structure and Function Evaluation (SAFE): II. Comparison of Optic Disk and Visual Field Characteristics"; American Journal of Ophthalmology; vol. 135; No. 2; 2003; pp. 148-154.

U.S. Appl. No. 11/392,268, filed Mar. 29, 2006, Abrámoff et al.

* cited by examiner

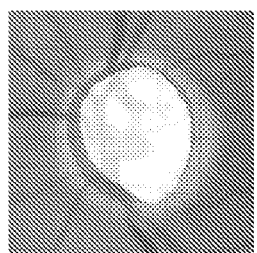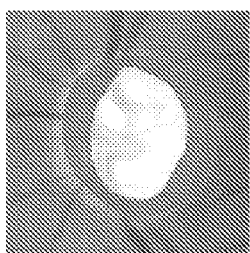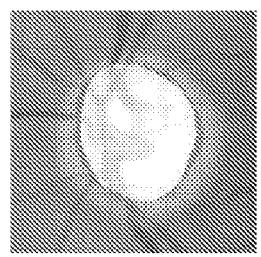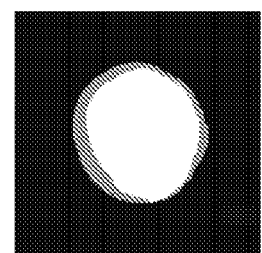
FIG. 6A  FIG. 6B  FIG. 6C  FIG. 6D
FIG. 6

METHODS AND SYSTEMS FOR OPTIC NERVE HEAD SEGMENTATION

CROSS REFERENCE TO RELATED PATENT APPLICATIONS

This application claims priority to U.S. Provisional Application No. 60/788,767 filed Apr. 3, 2006 and U.S. Provisional Application No. 60/789,045 filed Apr. 4, 2006, both of which are herein incorporated by reference in their entireties.

BACKGROUND OF THE INVENTION

Glaucoma is one of the leading causes of blindness, characterized by gradual damage to the optic nerve and resultant visual field loss. Early diagnosis and optimal treatment have been shown to minimize the risk of visual loss due to glaucoma. The hallmark of glaucomatous progression is cupping of the optic nerve head.

One way of determining the amount of cupping is planimetry by experienced glaucoma specialists from stereo color photographs of the optic nerve head. Recently, computerized retinal imaging methods such as Heidelberg Retinal Tomography (HRT), Optical Coherence Tomography (OCT) and GDx that offer tomography or nerve fiber layer thickness imaging have become available; however, these have not replaced the stereo photographs of the optic disc. What is needed are methods and systems for automated planimetry that allows cupping of the nerve head to be determined objectively, and quantitatively from stereo photographs of the optic nerve.

SUMMARY OF THE INVENTION

A method of classifying an optic nerve cup and rim of an eye from a retinal image is provided. The method comprises receiving a retinal image, determining a feature vector for a candidate pixel in the retinal image and classifying the candidate pixel as an optic nerve cup, blood vessel, or optic nerve rim pixel based on the feature vector using a trained classifier. The retinal image can be a stereo pair. The retinal image can be monochrome. The retinal image can be color. The classifier can be selected from the group consisting of a k-Nearest Neighbors classifier, a linear discriminant classifier, a quadratic discriminant classifier, and a support vector machine. Furthermore, training the classifier can comprise presenting, to the classifier, a pre-classified pixel and a feature vector associated with the pre-classified pixel and determining, by the classifier, an optimal feature vector for the pre-classified pixel from a pre-determined set of features. The method disclosed herein can further comprise identifying an optic nerve, identifying an optic nerve cup and optic nerve rim, identifying a blood vessel, and determining a cup-to-disc ratio.

The pre-determined set of features can comprise a non-stereo feature and a stereo disparity feature. The non-stereo feature can be selected from the group comprising Gaussian derivatives of arbitrary scale, order and orientation Gabor wavelets of arbitrary scale, spatial frequency, orientation, texture feature based on intensity, texture feature based on hue, texture feature based on saturation, texture feature based on variance, color feature based on intensity, color feature based on hue or saturation, color feature based color opponency, Hessian derivatives of arbitrary scale and eigen-value sort order, difference of Gaussian convolution of different scales. The stereo disparity feature can include depth, naïve shifted stereo difference, physiologically plausible stereo shift estimation using Gabor wavelets, stereo disparity maps obtained, for example, from the output of the Kolmogorov and Birchfield graph-cut stereo disparity algorithms, and optic nerve head shape maps from other imaging modalities, such as Optical Coherence Tomography depth maps, ultrasound depth maps, or confocal scanning laser topographic maps.

Additional advantages of the invention will be set forth in part in the description which follows or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention:

FIG. 6 A, B, C illustrates gradings of an optic disc stereo pair by three faculty glaucoma specialists;

FIG. 6 D illustrates the reference standard created from FIG. 6 A, B, C with white, cup, gray, rim, and black, background;

DETAILED DESCRIPTION OF THE INVENTION

Before the present methods and systems are disclosed and described, it is to be understood that this invention is not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present invention may be understood more readily by reference to the following detailed description of preferred embodiments of the invention and the Examples included therein and to the Figures and their previous and following description.

Pixel feature classification is a machine learning technique that assigns an image's pixels a class, in this case one of cup, rim, or background. Pixel feature classification can use multiple pixel features, each of which can be numeric properties of a pixel and/or its surroundings, by way of example and not limitation, its color, its intensity, the difference of its intensity with respect to neighboring pixels, whether it is on an edge and the like. Features can be calculated by convolution of the image with a kernel chosen for that feature.

Pixel feature classification can mimic human experts' visual performance because it can integrate parallel visual "channels," from feature detectors as known to occur in primate visual cortex processing. Disclosed are methods using pixel features for color that mimic the output of light-dark, red-green, and blue-yellow opponency responsive cortical cells with different receptive field sizes and orientation. Also disclosed are methods using features for stereo disparity that mimic the output of visual cortex VI complex cells.

A retinal image is generally described herein as a color retinal image for exemplary purposes only, the retinal image can be monochrome.

I. Methods

A. Generally

Figure 1:
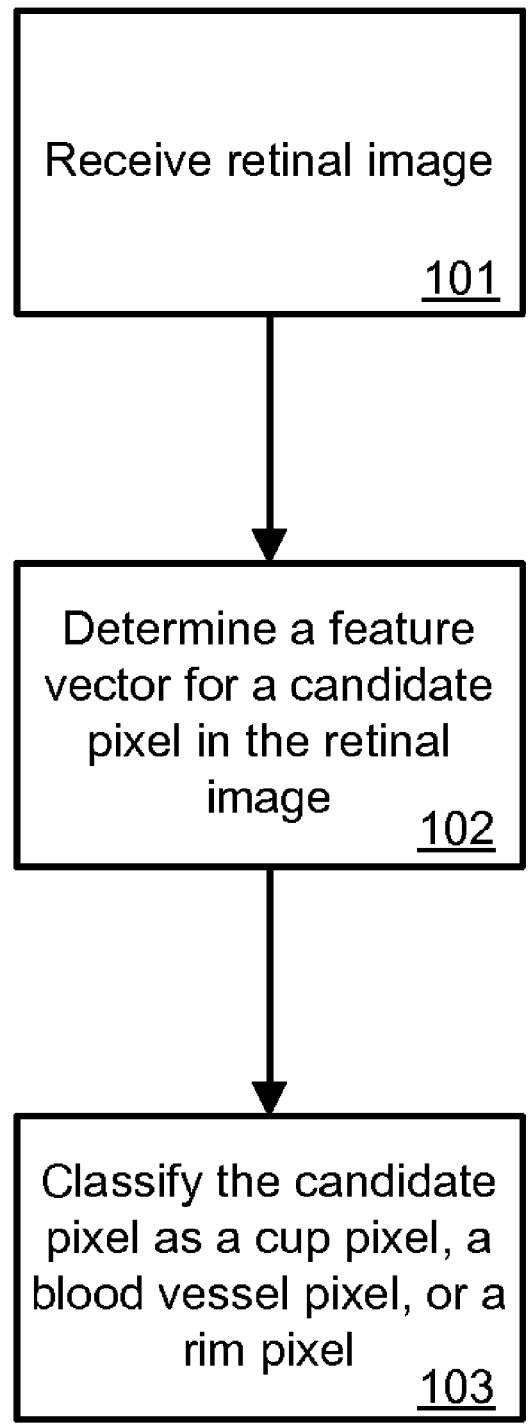
FIG. 1 is a flow diagram illustrating exemplary steps of the disclosed method.
Figure 2:
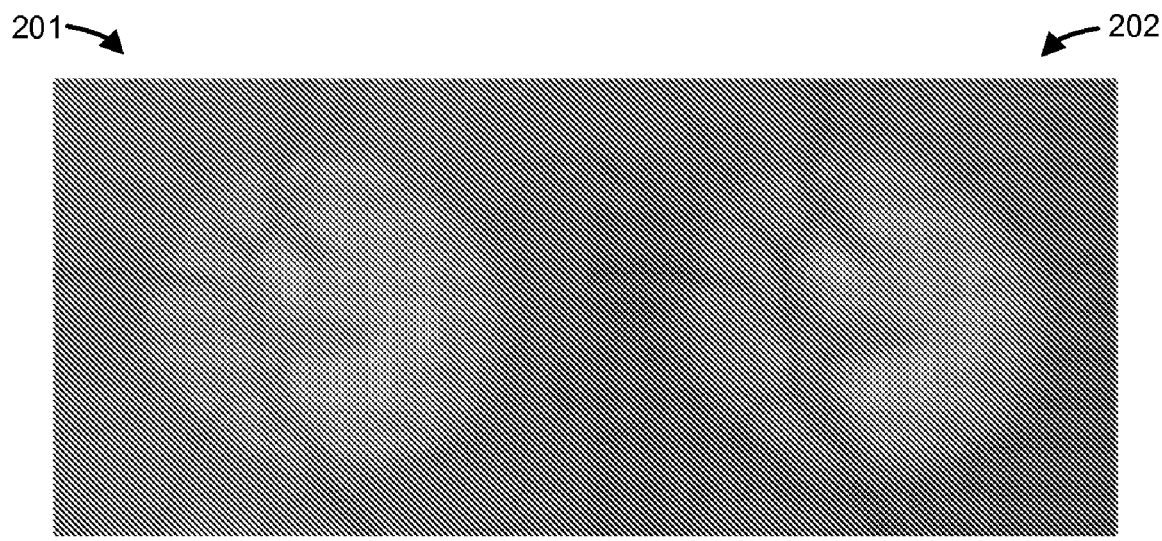
FIG. 2 is a color retinal image stereo pair.

As shown in FIG. 1, provided are methods of classifying an optic nerve cup, a blood vessel, and an optic nerve rim of an eye from a retinal image comprising receiving a retinal image at block 101, determining a feature vector for a candidate pixel in the retinal image at block 102, and classifying the candidate pixel as a cup pixel, a blood vessel pixel, or a rim pixel based on the feature vector using a trained classifier at block 103. The retinal image can be a stereo pair as shown in FIG. 2. The retinal image can be color. The retinal image can be monochrome. The exemplary stereo color pair in FIG. 2 is of the optic nerve head of a left eye after alignment and cropping to 512×512 pixels. The left, 201, and right, 202, stereo images can be fused by holding FIG. 2 at about 30 cm (12") distance from the eye and gazing into infinity. The methods disclosed herein can further comprise identifying a blood vessel, identifying an optic nerve, identifying an optic nerve cup and optic nerve rim, and determining a cup-to-disc ratio.

As known in the art, the trained classifier can be, for example, a k-Nearest Neighbors classifier, a linear discriminant classifier, a quadratic discriminant classifier, a support vector machine, and the like. Furthermore, training the classifier can comprise presenting, to the classifier, a pre-classified pixel and a feature vector associated with the pre-classified pixel and determining, by the classifier, an optimal feature vector for the pre-classified pixel from a pre-determined set of features.

Features that are especially useful for discrimination of cup and rim include a-priori (see below) probability maps of a pixel being a rim or cup pixel based on its localization, Gabor wavelets of varying mostly vertical orientation of high frequency that are most likely to encode oriented textures in the optic nerve, Gabor wavelets using yellow-blue and red-green opponency contrast most likely to encode colored textures, and Hessian Matrix eigenvectors of scales of 8, 16, or 32 pixels which most likely respond to blood vessel size and orientation.

The pre-determined set of features can comprise a non-stereo feature and a stereo disparity feature. The non-stereo feature can be, for example, Gaussian derivatives of arbitrary scale, order and orientation Gabor wavelets of arbitrary scale, spatial frequency, orientation, texture feature based on intensity, texture feature based on hue, texture feature based on saturation, texture feature based on variance, color feature based on intensity, color feature based on hue, color feature based on saturation, Hessian derivatives of arbitrary scale and eigenvalue sort order, difference of Gaussian convolution of different scales, disc hemorrhage, and the like. The stereo disparity feature can comprise, for example, depth, naïve shifted stereo difference, physiologically plausible stereo shift estimation using Gabor wavelets, stereo disparity maps obtained, for example, from the output of the Kolmogorov and Birchfield graph-cut stereo disparity algorithms, and optic nerve head shape maps from other imaging modalities, such as Optical Coherence Tomography depth maps, ultrasound depth maps, confocal scanning laser topographic maps, and the like.

Post-processing techniques can be used to reduce noise. As known in the art, post-processing techniques can comprise, for example, Gaussian filter smoothing, Iterated Contextual Pixel Classification, convex set resegmentation, and the like.

B. Pixel Feature Computation

A feature of a pixel in an image can be defined as an emergent local, regional or global (with respect to the image) numeric characteristic. Following this definition, the number of potential features for any pixel is almost unlimited, because any number of pixels in the image can be taken into account to compute a feature. In an aspect of the methods and systems described herein, a small subset of features can be selected, for example, smaller than 20, as this enables improved classification. Because all of the potential features cannot be taken into account, such a selection can be arbitrary to some extent and carry a bias. The object of pixel feature classification is to select an optimal subset to classify the images, from as large a set of potential features as possible, in order to avoid selection bias as much as possible.

In pixel classification, the Gaussian filterbank, or the convolution of the image with multiple Gaussian zero, first and second order steerable derivative kernels can be a default step to obtain a set of features for each pixel in an image. By careful selection of the steerable Gaussian kernels in the filter bank, second order invariant features can be calculated, so that all other features up to second order are combinations of the features in this invariant set. Gaussian filterbank features can be obtained from intensity values of the (color) image, and therefore, all color information available for a pixel is lost in the feature. The color of each pixel can be transformed into hue, saturation, brightness space. Also the variance in the R, G and B channels in a small region around the pixel can be used to include color information in a feature.

Desirable results can be reached with a color opponency Gaussian filterbank. $L_{db}$, $L_{rg}$, $L_{by}$, for dark-light, red-green and blue-yellow opponency images, can be computed from each color image as follows:

$$L_{db} = \frac{L_r + L_g + L_b}{3}$$

$$L_{rg} = L_r - L_g$$

$$L_{by} = (Lr + L_g) - 2L_b$$

with $L_r$, $L_g$, $L_b$ the red, green and blue channels of the left image of the stereo pair respectively.

$L_{db}$, $L_{rg}$, $L_{by}$ can then each be convolved with Gaussian filterbank kernels to obtain the following color-opponency Gaussian derivative features $$L_0(\sigma), L_1^{0°}(\sigma), L_1^{90°}(\sigma), L_2^{0°}(\sigma), L_2^{60°}(\sigma), L_2^{120°}(\sigma)$$

with $L_{n,op}^{\alpha}(\sigma)$ the feature obtained by computing $L_n^{\alpha}(\sigma) = L_1 \otimes G_n^{\alpha}(\sigma)$ for order n, orientation α (0° and 90° orientation to the local gradient for first order and 0°, 60°, and 120° to the local gradient for second order derivatives), scale $\sigma \in (2, 4, 8, 16, 32, 64)$ and opponency image $L_{op} \in (L_{db}, L_{rg}, L_{by})$, $\otimes$ denotes convolution. $L_n^{\alpha}$ is computed as follows:

$$L_0 = L_1$$

$$L_1^{\alpha} = \cos \alpha L_x + \sin \alpha L_x$$

$$L_2^{\alpha} = \cos^2 \alpha L_{xx} + \cos \alpha \sin \alpha L_{xy} + \sin^2 \alpha L_{yy}$$

where the lettered (xx, yy, xy) subscripts to L denote differentiation of $L_{op}$ to x and/or y. This results in 108 color opponency Gaussian filterbank features.

Figure 3:
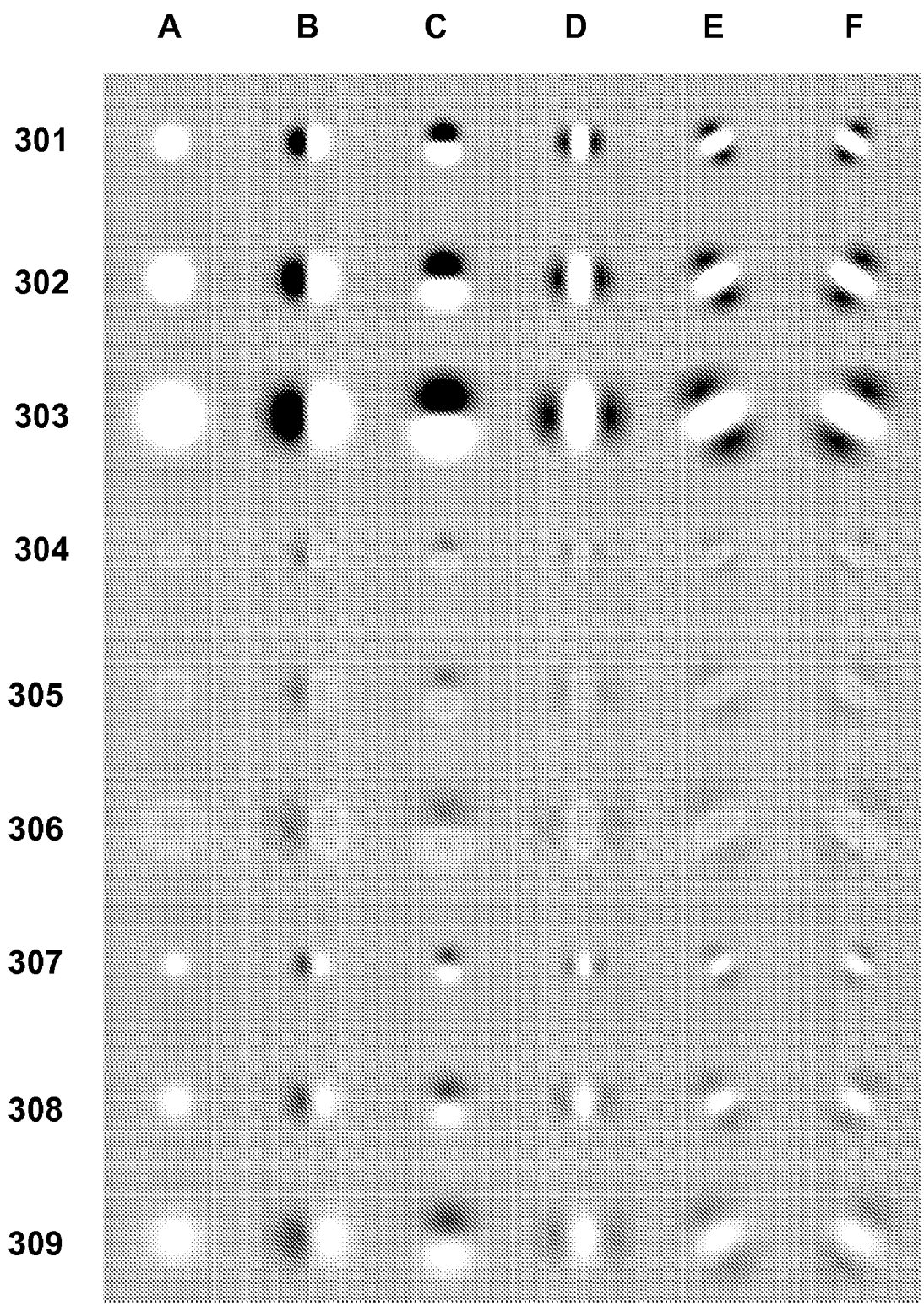
FIG. 3 provides examples of the variety of color opponency steerable Gaussian filterbank kernels used to compute pixel features for different scales and orders.

FIG. 3 provides examples of the variety of color opponency steerable Gaussian filterbank kernels used to compute pixel features for different scales and orders. Kernels are oriented as if the local gradient was horizontal, and are grouped from top to bottom by color opponency: light-dark (brightness contrast) (rows 301, 302, and 303), red-green contrast (rows 304, 305, and 306) and blue-yellow contrast (rows 307, 308, and 309).

The light-dark group (rows 301-303) illustrates a light generally circular shape as the only shape at positions 301A, 302A, and 303A; as the shape on the right at positions 301B, 302B, and 303B; as the shape on the bottom at positions 301C, 302C, and 303C; and as the shape in the middle at positions 301D, 302D, 303D, 301E, 302E, 303E, 301F, 302F, and 303F. The light-dark group (rows 301-303) illustrates a dark generally circular shape as the shape on the left at positions 301B, 302B, and 303B; as the shape on top at positions 301C, 302C, and 303C; as the two shapes on the sides at positions 301D, 302D, and 303D; and as the two shapes on top and bottom at positions 301E, 302E, 303E, 301F, 302F, and 303F.

The red-green contrast group (rows 304-306) illustrates a green generally circular shape as the only shape at positions 304A, 305A, and 306A; as the shape on the right at positions 304B, 305B, and 306B; as the shape on the bottom at positions 304C, 305C, and 306C; and as the shape in the middle at positions 304D, 305D, 306D, 304E, 305E, 306E, 304F, 305F, and 306F. The red-green contrast group (rows 304-306) illustrates a red generally circular shape as the shape on the left at positions 304B, 305B, and 306B; as the shape on top at positions 304C, 305C, and 306C; as the two shapes on the sides at positions 304D, 305D, and 306D; and as the two shapes on top and bottom at positions 304E, 305E, 306E, 304F, 305F, and 306F.

The blue-yellow contrast group (rows 307-309) illustrates a yellow generally circular shape as the only shape at positions 307A, 308A, and 309A; as the shape on the right at positions 307B, 308B, and 309B; as the shape on the bottom at positions 307C, 308C, and 309C; and as the shape in the middle at positions 307D, 308D, 309D, 307E, 308E, 309E, 307F, 308F, and 309F. The blue-yellow contrast group (rows 307-309) illustrates a blue generally circular shape as the shape on the left at positions 307B, 308B, and 309B; as the shape on top at positions 307C, 308C, and 309C; as the two shapes on the sides at positions 307D, 308D, and 309D; and as the two shapes on top and bottom at positions 307E, 308E, 309E, 307F, 308F, and 309F.

Within each group, from left to right, zeroth order (column A), first order 0° to the local gradient (column B), first order 90° to the local gradient (column C), second order 0° to the local gradient (column D), second order 60° to the local gradient (column E) and second order 150° to the local gradient (column F). Within each group, from top to bottom, scale 32 pixels (rows 301, 304, and 307), 64 pixels (rows 302, 305, and 308) and 128 pixels (rows 303, 306, and 309). Smaller scales not shown because they are difficult to see. The kernel images shown also represent the response of each of the features to an impulse function.

C. Stereo Features

Because expert human graders require stereo photographs for optimal segmentation of the optic nerve head, horizontal stereo disparity maps can be added as features. Stereo disparity maps that were obtained from the output of the Kolmogorov and Birchfield graph-cut stereo disparity algorithms can be used. Other stereo features that can be used include physiologically plausible stereo shift estimation maps using Gabor wavelets and optic nerve head shape map from other imaging modalities, such as Optical Coherence Tomography depth maps, ultrasound depth maps, confocal scanning laser topographic maps, and the like.

Figure 4:
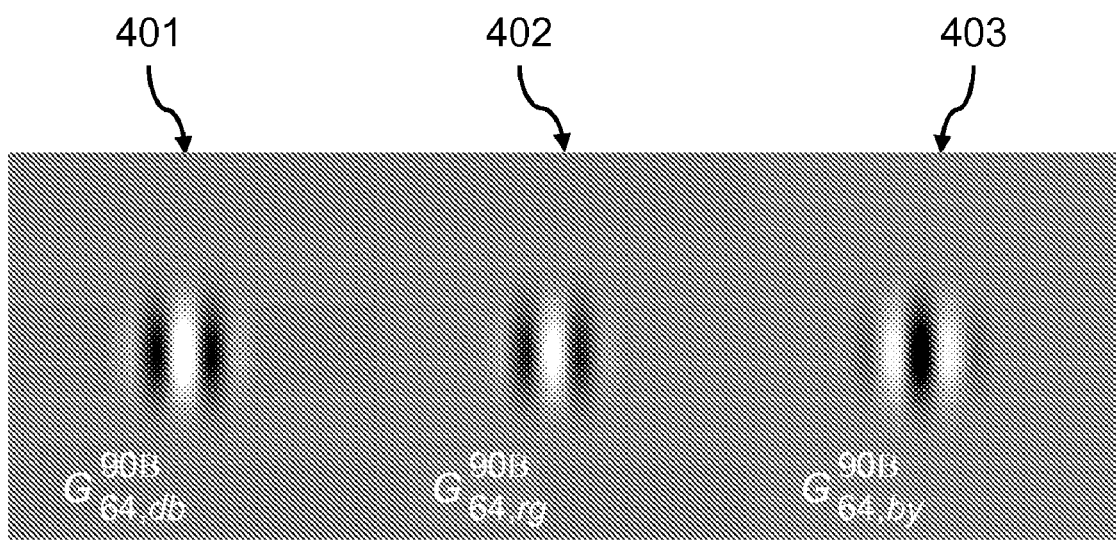
FIG. 4 provides color opponency Gabor wavelet kernels $G_{o,op}^{\alpha}$ at orientation $\alpha=90°$, in light-dark, red-green and blue-yellow opponency used in stereo disparity feature computations.

The output of binocular simple cells in the mammalian VI can closely correspond to the convolution of its receptive field with Gabor functions with the same spatial frequency and scale but different phases for the left and right field, and stereo disparity sensitive complex cells can be modeled by summing the squared outputs of two simple cells with different phases, but the same size receptive field. Gabor features $G_{\sigma,op}^{\alpha}$ can be calculated by convolution of the three opponency images op $\in (L_{db}, L_{rg}, L_{by})$ with Gabor wavelet kernel at scales σ=1, 2, 4, 8, 16, 32 pixels, at orientation α=0°, 45°, 90°, and 135°:

$$G_{\sigma,op}^{\alpha}(x, y) = e^{-\frac{x^2}{2\sigma^2}} \cos(\omega x + \varphi)$$

with phase φ 0 and with spatial frequency $$\omega = \frac{\pi}{\sigma}$$

constant, for a total of 82 features. FIG. 3 provides an example of these kernels. FIG. 4 provides color opponency Gabor wavelet kernels $G_{\sigma,op}^{\alpha}$ at orientation α=90', in light-dark 401, red-green 402 and blue-yellow 403 opponency used in stereo disparity feature computations. In light-dark 401, the middle band is light, the bands to the left and right side of the middle band are dark, and the bands to the left and right side of the dark bands are light. In red-green 402, the middle band is green, the bands to the left and right side of the middle band are red, and the bands to the left and right side of the red bands are green. In blue-yellow 403, the middle band is blue, the bands to the left and right side of the middle band are yellow, and the bands to the left and right side of the yellow bands are blue.

Stereo disparity features can be computed by first convolving the left and right color opponency images with left and right Gabor kernels $k_l$ and $k_l$ $$k_l(x) = e^{-\frac{x^2}{2\sigma^2}} \cos(\omega x + \varphi_l)$$

$$k_r(x) = e^{-\frac{x^2}{2\sigma^2}} \cos(\omega x + \varphi_r)$$

where $\phi_l$, $\phi_r$ are the left and right phases of a Gabor wavelet, and $\omega$ its preferred spatial frequency, which can be kept constant at $$\omega = \frac{\pi}{\sigma}.$$

The linear combination of convolutions of the left and right images with these respective kernels mimicks the output of a simple cell:

$$S_\omega(\sigma, \phi_l, \phi_r) = L_{1,l} \otimes k_l + L_{1,r} \otimes k_r$$

with $L_{1,l}$, $L_{1,r}$ the left and right intensity images respectively.

The sum of the squares of two $$S_{1,\omega}(\sigma, \varphi_l, \varphi_r), S_{2,\omega}\left(\sigma, \varphi_l + \frac{\pi}{2}, \varphi_r + \frac{\pi}{2}\right)$$

formed quadrature pairs:

$$C_\omega(\sigma, \Delta\varphi) = (S_{1,\omega}(\sigma, \varphi_l, \varphi_r))^2 + \left(S_{2,\omega}\left(\sigma, \varphi_l + \frac{\pi}{2}, \varphi_r + \frac{\pi}{2}\right)\right)^2$$

with $\Delta\phi$ the phase difference $\Delta\phi = \phi_r - \phi_l$ between the right and left eye receptive fields. With $$\Delta\varphi \in \left\{\pi \frac{6}{8}\pi, \frac{4}{8}\pi, \frac{2}{8}\pi, 0, -\frac{2}{8}\pi, -\frac{4}{8}\pi, -\frac{6}{8}\pi\right\}, C_\omega(\sigma, \Delta\varphi)$$

can then be tuned to disparities of $\{-4, -3, -2, -1, 0, 1, 2, 3\}$ pixels respectively, calculated at scales $\sigma = 1, 2, 4, 8, 16, 32$ pixels, and for each of the $(L_{op}, R_{op}) \in \{(L_{db}, R_{db}), (L_{rg}, R_{rg}), (L_{by}, R_{by})\}$ color opponency pairs, resulting in 48 features for each of the color opponency spaces.

Finally, an a priori feature can be calculated that reflects the expectation of a pixel in a certain position to be cup, rim or background. A priori probabilities can be determined from the first few modes of Principal Component Analysis on the reference standard.

For example, a total of $82+3\times48+1$ features can be calculated, for 79,429,632 pixels in 101 color stereo pairs. Because these features can be calculated independently in parallel, as is the case in the primate visual system, this can be a parallel computation.

D. Classifier Implementation, Feature Selection

In pixel feature classification, a classifier is trained on a subset of all data, referred to as the training set, and then repeatedly tested on another subset of the data, referred to as the test set. By repeatedly testing with different subsets of all of the features, and comparing the performance of the classifier with these different feature subsets, an optimal subset of features can be selected. The k-nearest neighbor (kNN) classifier outperformed Support Vector Machines and Linear Discriminant Analyzer classifiers, however any classifier known in the art can be used. A kNN classifier has the advantage that no elaborate training is required and that only one parameter needs to be adjusted, the k.

Sequential forward feature selection can be used to obtain the optimal set of features, by adding all features to an initially empty feature set one by one and retaining only the new feature that showed the highest gain in classification performance. Setting k=501 can provide better performance over a range of feature vector lengths. However, acceptable k values range from 1 to 1001, as far as a fast response of the system is concerned.

Performance can be calculated in the form of balanced accuracy (a combination of sensitivity and specificity in a single number) by calculating the number of correctly classified pixels in equally sized samples from the rim, the cup and the background $$\pi = \frac{N_{r,T} + N_{c,T} + N_{b,T}}{N_r + N_c + N_b}$$

with $N_{r,T}$ the number of pixels correctly classified in a sample of rim pixels, $N_{c,T}$ the number of pixels classified correctly in a sample of cup pixels, $N_{b,T}$ the number pixels classified correctly as background in a sample of cup pixels, and $N_r = N_c = N_b$ the total number of pixels in each sample. Otherwise, because of the predominance of background pixels in the image, a method that is 'good' in classifying background but 'bad' in classifying rim would have an unfair advantage.

E. Data Analysis

A classifier can be optimized on the accuracy as explained above to find the set of optimally discriminant features. A clinically more useful measure can be used to compare the performance of the pixel feature classification and human experts to a reference standard. For this purpose, all pixels in all stereo pairs can be classified in a leave-one-out fashion. The resulting gradings can contain the method's estimate for each pixel as to whether that pixel was cup, rim or background, similar to the gradings by human experts. A linear cup-to-disc ratio can then computed for each graded image as a square root of area cup-to-disc ratio:

$$cd_{r,linear} = \sqrt{\frac{n_{c,P}}{n_{r,P} + n_{c,P}}}$$

with $n_{r,P}$ the number of pixels in each image that pixel feature classification classified as rim. This ratio, or linear cup to disc ratio, is used clinically for diagnosis and follow-up of glaucoma and other optic neuropathies.

II. Systems

Figure 5:
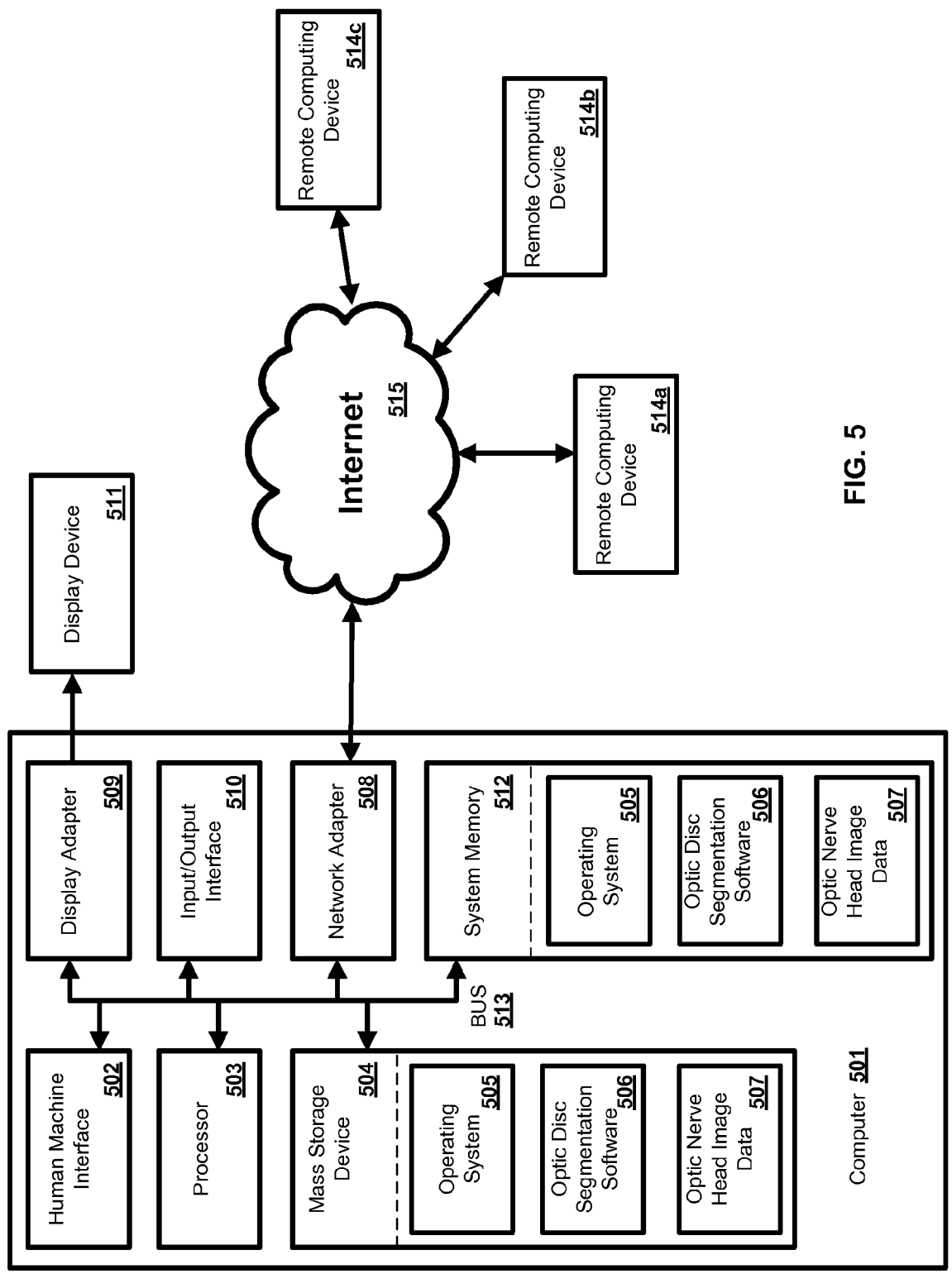
FIG. 5 is a block diagram illustrating an exemplary operating environment for performing the disclosed method.

FIG. 5 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 501. The components of the computer 501 can comprise, but are not limited to, one or more processors or processing units 503, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 513, and all buses specified in this description can also be implemented over a wired or wireless network connection and each of the subsystems, including the processor 503, a mass storage device 504, an operating system 505, optic disc segmentation software 506, optic nerve head image data 507, a network adapter 508, system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as optic nerve head image data 507 and/or program modules such as operating system 505 and optic disc segmentation software 506 that are immediately accessible to and/or are presently operated on by the processing unit 503.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and optic disc segmentation software 506. Each of the operating system 505 and optic disc segmentation software 506 (or some combination thereof) can comprise elements of the programming and the optic disc segmentation software 506. Optic nerve head image data 507 can also be stored on the mass storage device 504. Optic nerve head image data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a stereo projector. In addition to the display device 511, other output peripheral devices can comprise components such as speakers (not shown) and a printer (not shown) which can be connected to the computer 501 via Input/Output Interface 510.

The computer 501 can operate in a networked environment using logical connections to one or more remote computing devices 514a,b,c. By way of example, a remote computing device can be a personal computer, portable computer, a server, a router, a network computer, a peer device or other common network node, and so on. Logical connections between the computer 501 and a remote computing device 514a,b,c can be made via a local area network (LAN) and a general wide area network (WAN). Such network connections can be through a network adapter 508. A network adapter 508 can be implemented in both wired and wireless environments. Such networking environments are conventional and commonplace in offices, enterprise-wide computer networks, intranets, and the Internet 515.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of optic disc segmentation software 506 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

III. EXAMPLES

The following examples are put forth so as to provide those of ordinary skill in the art with a complete disclosure and description of how the methods and systems claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for.

The performance of pixel feature classification to segment the optic disc from color stereo photographs and the performance of glaucoma fellows on the same stereo images of the optic disc was compared against the results of three glaucoma faculty experts which provided the reference standard. Specifically, the performance of the pixel classification method to segment the optic disc photographs into cup, rim, and background was compared to the planimetric performance of the fellows against a reference standard planimetric segmentation by the glaucoma experts. It was also determined whether biologically plausible features increase the performance of the pixel feature classification method.

Stereo photographs of the optic disc were obtained from 70 consecutive patients who visited a glaucoma clinic. Color slide stereo photographs centered on the optic disc were acquired using a fixed stereo-base Nidek 3Dx stereo retinal camera (Nidek, Newark, N.J.); after development, slides were scanned at 4096×4096 pixel resolution, 24 bit depth with a Kodak slide scanner (Kodak Inc., Rochester, N.Y.). The left and right stereo images were then cropped to 512×512 pixels keeping the optic nerve head in the center. Those images judged to be of poor quality, due to media opacity, patient cooperation, scanning artifact etc., were excluded from the study; a total of 101 optic disc images from 70 patients were chosen for the study.

The study included 101 eyes of 70 patients. The age of the patients was 63.5±17.3 years (mean±SD). It included 41 females. The number of patients with glaucoma suspicion (including ocular hypertension), open-angle glaucoma (both primary and secondary), angle-closure glaucoma (primary and secondary), and combined mechanism (both open and closed-angle components) were 22, 37, 7, and 4 respectively.

Computer-aided planimetry of the stereo pairs using a hand-held stereoscope was performed by three faculty glaucoma specialists on all 101 images. Three glaucoma fellows also performed planimetry on all 101 stereo pairs in the same manner. The human grader was masked from the patient identifier and clinical information associated with the photographs. Each grader performed computer-assisted planimetry alone on all 101 images. Each grader was instructed to outline the disc margin while viewing the photographs using a stereo viewer. Then, the grader was instructed to draw the cup to the best of his ability. When the cup margin was difficult to identify (usually temporal slope of the disc), the grader was instructed to identify and draw the cup margin on the slope that is half way between the bottom of the cup and top of the rim.

A reference standard grading with a unique class (cup, rim, background) assigned to each pixel was then created by combining the grading by each faculty grader in a "majority-win" manner: each pixel was assigned the class that received the majority of votes (e.g. if two graders voted a pixel to be rim and one cup, the pixel assigned was rim).

FIG. 6 A, B, C illustrate gradings of an optic disc stereo pair by three faculty glaucoma specialists. Rim in grayish, cup in whitish, shown on the left image of the stereo pair. FIG. 6 D illustrates the reference standard created from FIG. 6 A, B, C with a white (or light) generally circular shape indicating cup, generally superimposed upon a gray generally circular shape indicating rim, and black indicating background.

To obtain the optimal set of features, for the first stage, the database of stereo image pairs was randomly divided into dataset A, of 50 stereo pairs and corresponding reference standard, and dataset B, 51 stereo pairs. Set A was used for training the pixel classification method; set B was used for testing. A hard classification using 'majority win' of the k nearest neighbors was used as the classification for each pixel. Each feature column in A was scaled to have zero mean and unit variance over all pixels. The same variance and mean were applied to normalize the feature columns in B. The most discrimant features were then selected in a sequential forward search fashion.

Figure 7:
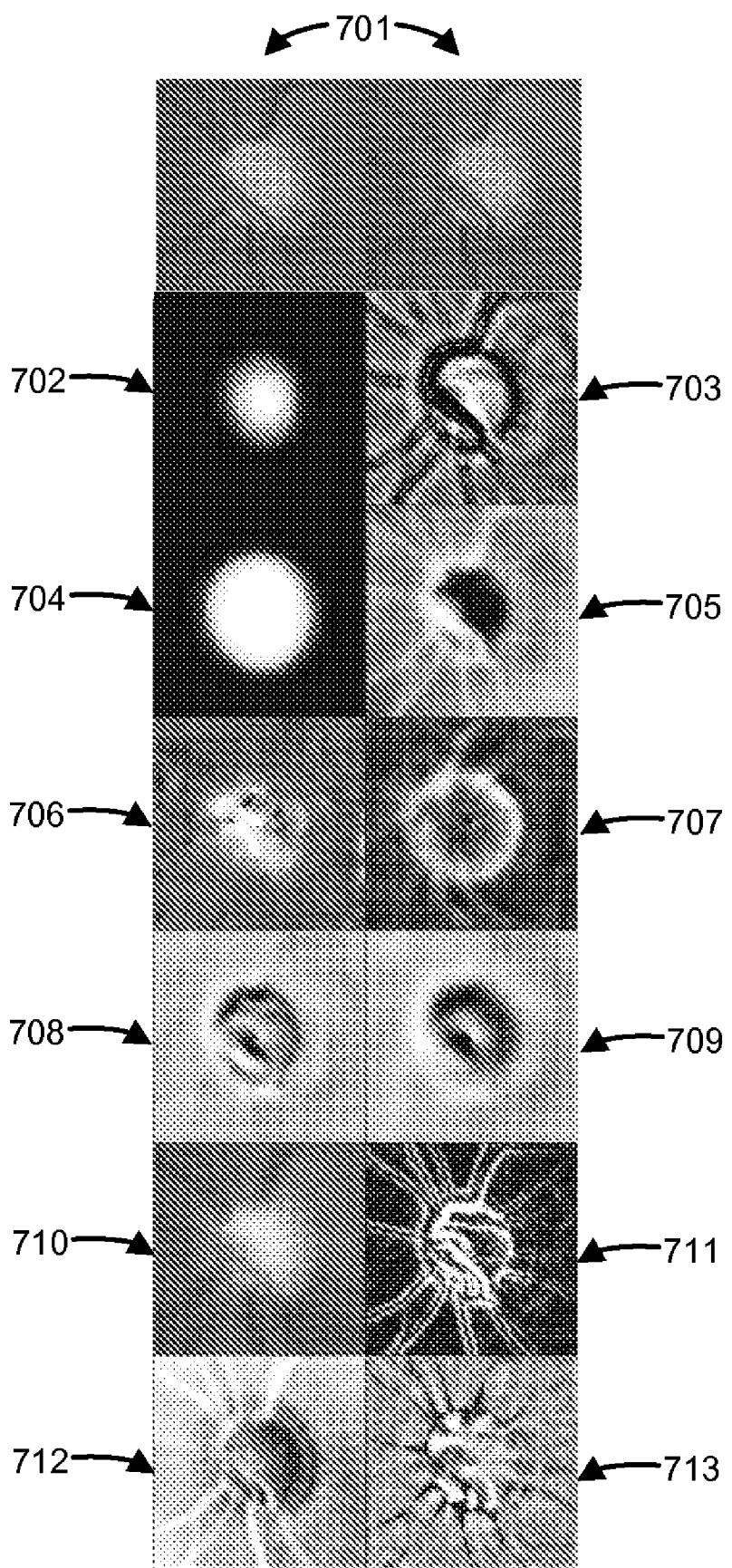
FIG. 7 illustrates a stereo pair and its most discriminant pixel features.

FIG. 7 illustrates a stereo pair 701 and its most discriminant pixel features. Rows below that show images of each pixels's feature magnitudes for the most dominant twelve features (see Table 1 for a description of these features ordered from top to bottom and from left to right).

TABLE 1

| Rank | Description | Scale (pixels) | Cumulative Accuracy | FIG. 7 Indicator |
|---|---|---|---|---|
| 1 | A priori probability of pixel being cup | n.a. | 0.810 | 702 |
| 2 | Red-green opponency second order Gaussian derivative transversal to local gradient | 32 | 0.825 | 703 |
| 3 | A priori probability of pixel being rim | n.a. | 0.829 | 704 |
| 4 | Red-green opp. Gaussian blurred (zeroth order) | 8 | 0.832 | 705 |
| 5 | Complex cell output tuned to a disparity of −12 pixels | 16 | 0.845 | 706 |
| 6 | Blue-yellow opp. 2nd order Gaussian derivative | 32 | 0.854 | 707 |
| 7 | Red-green opp. 1st order Gaussian derivative perpendicular to local gradient | 16 | 0.869 | 708 |
| 8 | Bright dark opp. Gaussian blurred (zeroth order) | 16 | 0.872 | 709 |
| 9 | Red-green opp. 1st order Gaussian derivative radial to local gradient | 4 | 0.874 | 710 |
| 10 | Blue-yellow Gaussian blurred (first-order) | 4 | 0.874 | 711 |
| 11 | Red-green opp. 1st order Gaussian derivative parallel to local gradient | 4 | 0.875 | 712 |
| 12 | Red-green opp. Gaussian blurred (zeroth order) | 32 | 0.876 | 713 |

Table 1 shows the twelve features that were found to be most dominant, ranked by their contribution to cumulative accuracy. The second column is the description of the feature, the third column is the scale of the feature in pixels, if applicable, the fourth column shows cumulative accuracy, and the fifth column indicates the corresponding indicator in FIG. 7. Accuracy with 12 features was 0.876, in other words, the method was able to assign about 88% of all pixels to the correct class. FIG. 7 shows an example stereo pair and those pixel features that were most discriminant features. The accuracy, or the percentage of correctly classified pixels, is not a clinically relevant measure.

Figure 8:
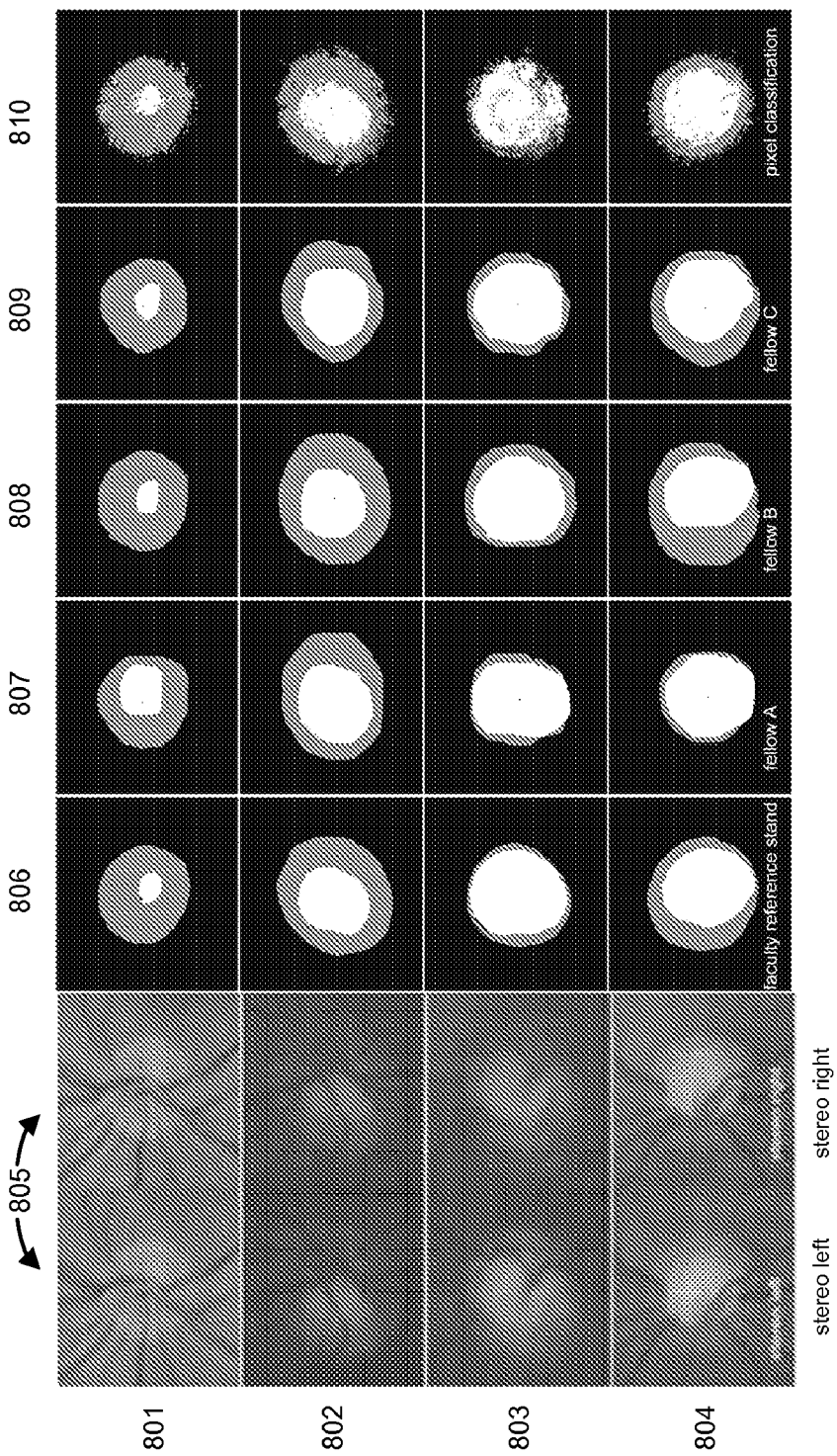
FIG. 8 shows how the gradings by the glaucoma faculty, the glaucoma fellows and the method compare to each other visually.

All pixels in all stereo pairs were graded by the method, using the same most discriminant set of features. FIG. 8 shows how the gradings by the glaucoma faculty, the glaucoma fellows and the method compare to each other visually. Small 801, medium 802 and large 803 disc excavation and excavation with inferior notching 804. Left and right images of the stereo pair are in column 805; reference standard by glaucoma faculty are in column 806; grading by fellow A 807, by fellow B 808 and by fellow C 809; and grading by the disclosed methods 810. Correlation of the linear cup to disc ratio for each of the glaucoma fellows with the reference standard was about 0.74 (95% Confidence Interval (CI), 0.67-0.84), about 0.84 (95% CI, 0.77-0.89) and about 0.90 (95% CI, 0.85-0.93), respectively. Correlation of the method with the reference standard was about 0.92 (95% CI, 0.88-0.94).

Figure 9:
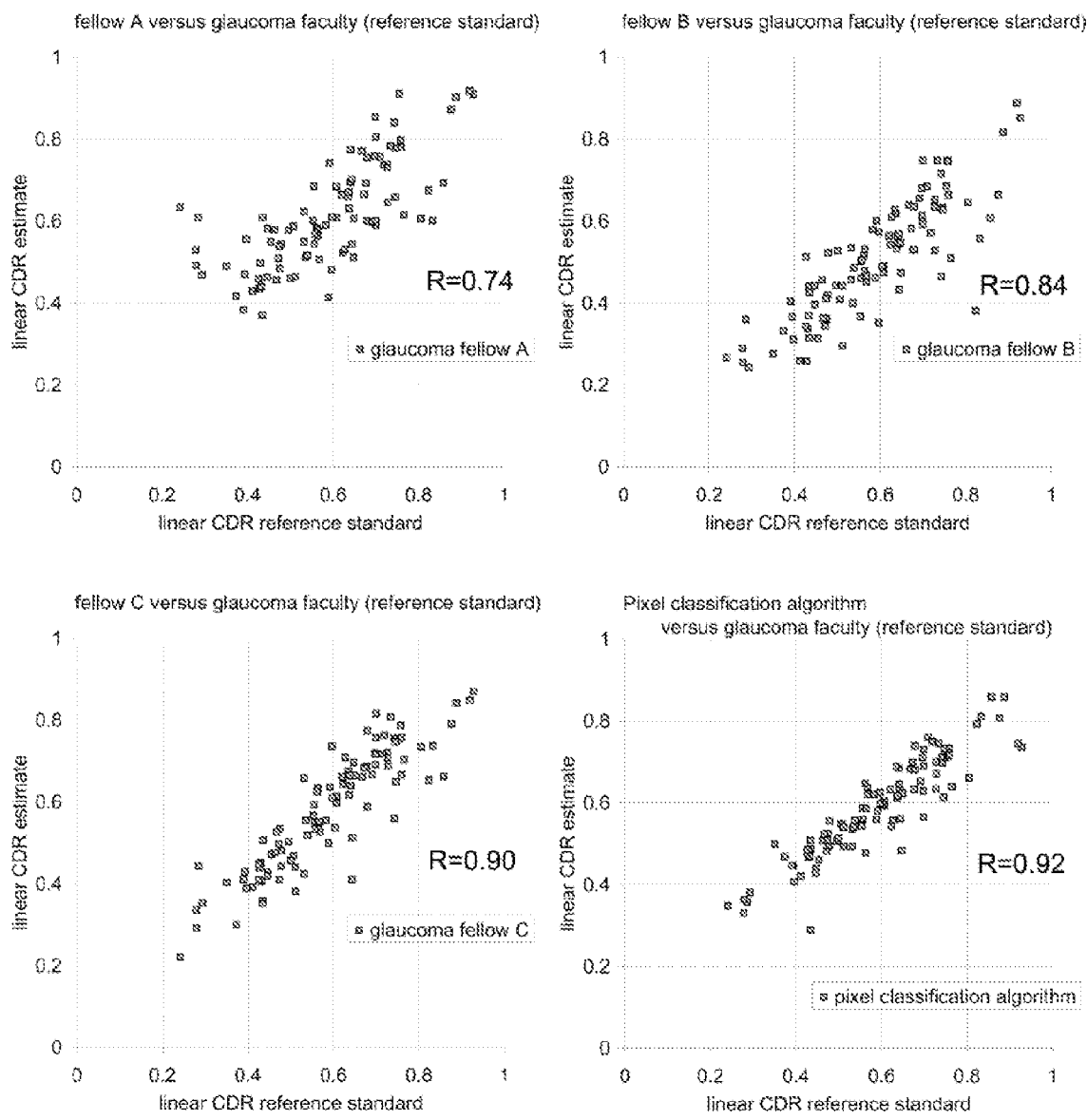
FIG. 9 shows scatter plots of linear cup-to-disc ratio estimates from all stereo pairs by three glaucoma fellows and the pixel feature classification method (vertical axes), against the reference standard grading by three glaucoma faculty (horizontal axes).

FIG. 9 shows scatter plots of linear cup-to-disc ratio estimates from all stereo pairs by three glaucoma fellows and the pixel feature classification method (vertical axes), against the reference standard grading by three glaucoma faculty (horizontal axes). Fellow A 901, B 902, fellow C 903, and the disclosed methods 904.

The results show that the disclosed methods utilizing pixel feature classification with biologically plausible features can classify a set of optic disc stereo images with an accuracy that comes to that of ophthalmologists. Objective classification for the classification of optic disc cup and rim from color stereo photographs allows optic disc stereo photographs to be evaluated objectively and rapidly. A use of the methods includes the objective measurement of glaucoma progression, or enlargement of the optic cup over time.

While this invention has been described in connection with preferred embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of classifying an optic nerve cup, a blood vessel, and optic nerve rim of an eye from a retinal image comprising:
   receiving a retinal image;
   determining a feature vector for a candidate pixel in the retinal image; and
   classifying the candidate pixel as a cup pixel, a blood vessel pixel, or a rim pixel based on the feature vector using a trained classifier, wherein the classifier is at least one of:

a k-Nearest Neighbors classifier; a linear discriminant classifier; and a quadratic discriminant classifier.

2. The method of claim 1, wherein the retinal image is selected from the group consisting of:
a color retinal image;
a monochrome retinal image;
a retinal image reconstructed from a 3D volume set of retinal images;
a color stereo pair; and
a monochrome stereo pair.

3. The method of claim 1, wherein training the classifier comprises:
presenting, to the classifier, a pre-classified pixel and a feature vector associated with the pre-classified pixel; and
determining, by the classifier, an optimal feature vector for the pre-classified pixel from a pre-determined set of features.

4. The method of claim 3, wherein the pre-determined set of features comprises a non-stereo feature and a stereo disparity feature.

5. The method of claim 4, wherein the non-stereo feature is selected from the group consisting of:
Gaussian derivatives of arbitrary scale;
order and orientation Gabor wavelets of arbitrary scale;
spatial frequency;
orientation;
texture feature based on intensity;
texture feature based on hue;
texture feature based on saturation;
texture feature based on variance;
color feature based on intensity;
color feature based on hue;
color feature based on saturation;
Hessian derivatives of arbitrary scale and eigenvalue sort order; and
difference of Gaussian convolution of different scales.

6. The method of claim 4, wherein the stereo disparity feature is selected from the group consisting of:
depth map from stereo image;
physiologically plausible stereo shift estimation using Gabor wavelets; and
optic nerve head shape map from an imaging modality.

7. The method of claim 1, further comprising:
identifying an optic nerve;
identifying an optic nerve cup and optic nerve rim; and
determining a cup-to-disc ratio.

8. A computer readable medium with computer readable code embodied thereon, for performing the steps of:
receiving a color retinal image;
determining a feature vector for a candidate pixel in the color retinal image; and
classifying the candidate pixel as a cup pixel, a blood vessel pixel, or a rim pixel based on the feature vector using a trained classifier, wherein the classifier is at least one of: a k-Nearest Neighbors classifier; a linear discriminant classifier; and a quadratic discriminant classifier.

9. The computer readable medium of claim 8, wherein the color retinal image is selected from the group consisting of:
a color retinal image;
a monochrome retinal image;
a color stereo pair; and
a monochrome stereo pair.

10. The computer readable medium of claim 8, wherein training the classifier comprises:
presenting, to the classifier, a pre-classified pixel and a feature vector associated with the pre-classified pixel; and
determining, by the classifier, an optimal feature vector for the pre-classified pixel from a pre-determined set of features.

11. The computer readable medium of claim 10, wherein the pre-determined set of features comprises a non-stereo feature and a stereo disparity feature.

12. The computer readable medium of claim 11, wherein the non-stereo feature is selected from the group consisting of:
Gaussian derivatives of arbitrary scale;
order and orientation Gabor wavelets of arbitrary scale;
spatial frequency;
orientation;
texture feature based on intensity;
texture feature based on hue;
texture feature based on saturation;
texture feature based on variance;
color feature based on intensity;
color feature based on hue;
color feature based on saturation;
Hessian derivatives of arbitrary scale and eigenvalue sort order; and
difference of Gaussian convolution of different scales.

13. The computer readable medium of claim 11, wherein the stereo disparity feature is selected from the group consisting of:
depth map from stereo image;
physiologically plausible stereo shift estimation using Gabor wavelets; and
optic nerve head shape map from an imaging modality.

14. The computer readable medium of claim 8, further comprising:
identifying an optic nerve;
identifying an optic nerve cup and optic nerve rim; and
determining a cup-to-disc ratio.

15. A system for classifying an optic nerve cup, a blood vessel, and an optic nerve rim of an eye from a color retinal image, comprising:
a computer readable medium; and
a processor programmed to:
receive a color retinal image,
determine a feature vector for a candidate pixel in the color retinal image, and
classify the candidate pixel as a cup pixel, a blood vessel pixel, or a rim pixel based on the feature vector using a trained classifier, wherein the classifier is at least one of: a k-Nearest Neighbors classifier; a linear discriminant classifier; and a quadratic discriminant classifier.

16. The system of claim 15, wherein the color retinal image is selected from the group consisting of:
a color retinal image;
a monochrome retinal image;
a color stereo pair; and
a monochrome stereo pair.

17. The system of claim 15, wherein training the classifier comprises:
presenting, to the classifier, a pre-classified pixel and a feature vector associated with the pre-classified pixel; and
determining, by the classifier, an optimal feature vector for the pre-classified pixel from a pre-determined set of features.

18. The system of claim 17, wherein the pre-determined set of features comprises a non-stereo feature and a stereo disparity feature.

19. The system of claim 18, wherein the non-stereo feature is selected from the group consisting of:
- Gaussian derivatives of arbitrary scale;
- order and orientation Gabor wavelets of arbitrary scale;
- spatial frequency;
- orientation;
- texture feature based on intensity;
- texture feature based on hue;
- texture feature based on saturation;
- texture feature based on variance;
- color feature based on intensity;
- color feature based on hue;
- color feature based on saturation;
- Hessian derivatives of arbitrary scale and eigenvalue sort order; and
- difference of Gaussian convolution of different scales.

20. The system of claim 18, wherein the stereo disparity feature is selected from the group consisting of:
- depth map from stereo image;
- physiologically plausible stereo shift estimation using Gabor wavelets; and
- optic nerve head shape map from an imaging modality.

21. The system of claim 15, wherein the processor is further programmed to perform the steps comprising:
- identifying an optic nerve;
- identifying an optic nerve cup and optic nerve rim; and
- determining a cup-to-disc ratio.

* * * * *

UNITED STATES PATENT AND TRADEMARK OFFICE
CERTIFICATE OF CORRECTION

PATENT NO. : 7,712,898 B2
APPLICATION NO. : 11/695779
DATED : May 11, 2010
INVENTOR(S) : Abramoff et al.

It is certified that error appears in the above-identified patent and that said Letters Patent is hereby corrected as shown below:

In column 1, line 4, insert the following before "Cross Reference to Related Applications":

--GOVERNMENT SUPPORT CLAUSE
This invention was made with government support under Grant EY017066 awarded by the National Institutes of Health. The government has certain rights in the invention.--

Signed and Sealed this

Twenty-ninth Day of June, 2010

David J. Kappos
*Director of the United States Patent and Trademark Office*